Jan. 13, 1970  W. A. MUELLER ET AL  3,489,827
PROCESS FOR THE MANUFACTURE OF AEROSOL FILTERS
Original Filed Oct. 29, 1963

William A. Mueller
Donald F. Maskey
George N. Ferguson
INVENTORS

United States Patent Office 3,489,827
Patented Jan. 13, 1970

3,489,827
PROCESS FOR THE MANUFACTURE OF AEROSOL FILTERS
William Anton Mueller, Donald Frederick Mashey, and George Nathan Ferguson, Memphis, Tenn., assignors to The Buckeye Cellulose Corporation, Cincinnati, Ohio, a corporation of Ohio
Original application Oct. 29, 1963, Ser. No. 319,777, now Patent No. 3,311,115, dated Mar. 28, 1967. Divided and this application June 10, 1966, Ser. No. 574,841
Int. Cl. B29d 27/00; A24c 5/48
U.S. Cl. 264—50                                6 Claims

ABSTRACT OF THE DISCLOSURE

A process for the manufacture of aerosol filters which comprises the steps of forming a fibrous slurry containing a substantial proportion of fibrillated cellulosic fibers, adding at least one elastomeric hydrophobic latex to the slurry, adding a surfactant and foaming the slurry to form an isotropic cellulose fibrous structure, coagulating said elastomeric, hydrophobic latex, shaping the so formed structure to form an aerosol filter unit and drying the filter unit in its distended condition.

---

Figure 1:
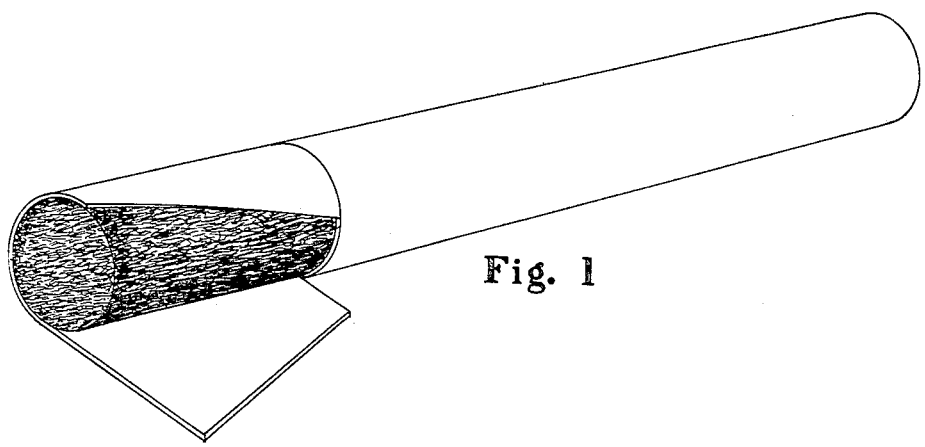

This application is a division under Rule 147 of copending patent application filed Oct. 29, 1963, Ser. No. 319,777, now Patent No. 3,311,115.

This invention relates to the production of aerosol filters and has for its general object the provision of efficient, low density filters for the filtration of fine liquid or solid particles from air or other gaseous media. Procedures for the manufacture of the aerosol filters are also provided.

More particularly, the invention provides the aerosol filters composed of completely isotropic cellular fibrous structures, which fibrous structures have a substantial content of fibrillated cellulosic fibers, and for a process whereby the isotropic cellular structures are shaped and controlled in density for the efficient accomplishment of particular aerosol filtrations.

Specifically, the invention provides an efficient aerosol filter for use in the filtration of smoke as generated by cigarettes, pipes, cigars, cigarillos and the like.

The novel aerosol filter of this invention is substantially composed of fibrillated cellulosic fibers arranged in a completely isotropic fibrous cellular structure and homogeneously bound together as a resilient unitary structure to produce a resilient, efficient filter with a low pressure drop in relation to its particulate retention effectiveness.

Several compositions and structures for use in the filtration of smoke and other aerosol suspensions are available in the prior art. For example, U.S. Patent No. 1,374,466, granted to George Pappanikolau on Apr. 12, 1921, teaches the use of natural sponge as a cigarette filter to filter cigarette smoke and to prevent empyreumatic odor and nicotine from reaching the smoker's lips. U.S. Patent No. 2,707,960, granted to Ludwig Janecke on May 10, 1955, teaches the use of two plugs composed of viscose sponge with compressed cotton between as a filter for cigarettes, cigars or cheroots. U.S. Patent No. 2,820,461, granted to Paul A. Muller on Jan. 21, 1958, teaches the use of a filter composed of multiple strips, axially disposed, of various paper or metallic strips interposed with fibers. U.S. Patent No. 2,805,671, granted to Edward J. Hackney on Sept. 10, 1957, teaches the use of a filter composed of an axial fiber bundle composed of fibers to whose peripheral surfaces are secured a multiplicity of alpha cellulose particles. U.S. Patent No. 3,039,908, granted to Harris B. Parmele et al. on June 19, 1962, teaches the use of a tobacco smoke filter composed of textile length fibers, coated with thermo-responsive binding material and gathered into a compressed roving bundle. Applicants have found that all of these prior art filters are subject to limitations in that the most effective of the prior art filters are subject to a greater than necessary pressure drop to obtain a given filtration effectiveness. Again many of the prior art filters are not adapted to the ready inclusion of desirable additives for the selective removal of carcinogenic or otherwise harmful particles, condensable gases or liquids from tobacco smoke. Applicants have found that the above limitations are overcome by the aerosol filter and process for its manufacture as herein described.

Accordingly, it is an object of this invention to provide a tobacco smoke filter having a completely isotropic and cellular arrangement in the fibers of which it is composed.

It is also an object of this invention to provide a tobacco smoke filter and a process for its manufacture, which tobacco smoke filter has the greatest possible effective impingement area for aerosol particles, condensable gases, and liquids for a given filter density.

It is a further object of this invention to provide a tobacco smoke filter and process for its manufacture which results in a low resistance to draw for a given filtration effectiveness.

It is a still further object of this invention to provide a cigarette filter and process which is readily adapted to the even distribution of selective or special additives or fibers in its structure.

In a preferred embodiment of the aerosol filter of this invention, fibrillated cellulosic fibers are fixed in a distended, completely isotropic arrangement with a fine structure of cellular voids surrounded by fibrous webs. The filter formation is, in general, carried out by foaming a slurry containing the fibers and coating the fibers contained therein with amounts of an elastomeric, hydrophobic latex. The completely isotropic arrangement of the fibers within the filter provides an optimum effective impingement area available to entrap and collect particles, condensable gases and liquid droplets from tobacco smoke and other aerosol suspensions. The isotropic fiber arrangement within the filter forces the smoke to take frequent reversals of flow and facilitates the aggregation, coalescence and absorption of suspended matter. It is further noted that the present isotropic structure is homogeneous so that the tobacco smoke is prevented from channeling, or otherwise bypassing any part of the filter structure. It is also specifically pointed out that the present isotropic structure prevents the emission of smoke condensates in large liquid slugs to cause irritating lip and mouth membrane contact and to otherwise annoy the smoker. The isotropic filter structure of this invention results, therefore, in a filter having the maximum filtration effectiveness at selected levels of pressure drop across the filter.

As those skilled in the art will realize, the formation of a suitable cigarette filter is a balance of factors since the higher pressure drops normally associated with increasingly effective filters will not be tolerated by a cigarette smoker above a certain level. At this point the pressure drop across the filter becomes so high that the smoker must exert an intolerable effort to overcome it. It is customary in the cigarette trade to refer to pressure drop across a cigarette as resistance to draw (RTD), measured in inches of water under standard conditions approximating the habits of an average smoker. Likewise smokers will not tolerate a filter which is too effective in removing flavor substances of one which introduces a foreign taste into the smoke. The isotropic fibrous filter of this invention avoids both high resistance to draw and the filtration or introduction of flavor elements to result in a favorable balancing of these taste factors.

A further advantage of the present cigarette filter is that it aids in maintaining a relatively low and constant burning temperature in a cigarette. This feature is desirable because a relatively low and constant burning temperature yields less tar with a lower carcinogenic activity in tobacco smoke. In explaining how the relatively low and constant burning temperature is obtained with the present filter, it is noted that the total RTD of a filter cigarette is the sum of the filter and tobacco RTD's. As the tobacco is consumed the tobacco, and the cigarette, RTD decreases providing increased draft to result in increased burning temperature. With the present filter, however, a balance is struck because as the tobacco RTD decreases the filter RTD increases due to trapped and absorbed material so that the total RTD of the cigarette remains nearly constant.

Although the fibrillated fibers of the present filter form a bond when foamed in the above mentioned isotropic position, applicants have found that these natural bonds are ruptured by the moisture present in normal smoking use. Applicants have overcome this difficulty by protecting the bonds with an elastomeric, hydrophobic latex. The latex bonding contributes to the resiliency and continued bonding of the isotropic structure fibers under the normal moist conditions of smoking. At the same time the pre-fibrillated condition of a substantial portion of the filter fibers makes it possible to achieve the necessary cohesiveness without the use of excessive amounts of latex binder. Also, the hydrophobic nature of the latex in conjunction with the hydrophilic nature of the underlying cellulose fibers acts as a selective trap for organic substances condensed or filtered from smoke and absorbed thru the partial hydrophobic fiber coating. Further, the initial fibrillated fiber bonds do not require the use of amounts of latex which would film over or otherwise block the fiber interstices in the isotropic filter structure. The filter fibers, held in close isotropic contact by natural bonding, are reinforced and moisture-proofed, with particular emphasis at the contact points, with an elastomeric, hydrophobic latex, to yield a unitary structure. The intimate fiber to fiber contact leads to a reduction in latex requirement, thus minimizing the formation of occluded fiber interstices to yield a structure of desirable resilience which provides maximum retention of the matter suspended in aerosols or smoke at a selected resistance to draw.

The general method of preparing an isotropic tobacco smoke filter according to the present invention comprises slurrying fibrillatable cellulosic fibers in water and refining them with refining equipment adapted to a fibrillating rather than a cutting action. The fibrillated cellulosic fibers are then treated successively with a small amount of wet strength resin and a compatible latex binder. The fiber slurry is then foamed to a semi-stiff foam by beating air into the slurry after adding a small amount of compatible surfactant. Compatibility as used herein is defined as the ability of the binder and foaming agents to perform their individual functions when present in the same slurry-foam system. Compatible wet strength resin, latex, surfactant systems are, for example, melamine-formaldehyde resin, styrene-butadiene latex, alkyl benzene sulfonate surfactant and urea-formaldehyde resin, styrene-butadiene latex, dodecyl dimethyl amine oxide surfactant. Other suitable and compatible binder-surfactant systems are known in the art and include the melamine-formaldehyde resin, acrylonitrile latex, alkyl benzene sulfonate surfactant system.

The resulting foam is then cast into desired filter shapes and dried to result in breaking the foam and leaving the fibers in a bound isotropic cellular structure whose density is controllable by the amount of air beaten into the foam, and, if desired, by post-drying compression. The foam can be cast, by extrusion into round or oval shapes for cigarette filter use, dried, wrapped and cut to cigarette filter plug length. The foaming and extrusion can be controlled to yield the density desired for cigarette filter plugs in one extrusion operation, or an extrusion blank can be made oversize and compressed after drying. Similarly, the foam can be cast into pads from which blanks are cut and laterally compressed to form round or oval cigarette filter units. Round cigarette filter blanks can also be punched from pads of suitable depth to form cigarette filters of a desired length.

Preferably, but not necessarily, the wet-strength resin is added to the slurry prior to the addition of the latex binder. This order of addition is not mandatory, however, and bonding can be accomplished in certain latex systems by the addition of two mutually incompatible latexes, for example, certain vinyl chloride latexes and acrylonitrile latexes, or in some instances, by the addition of the foaming agent itself.

The completely isotropic cellular fibrous mass of the aerosol filter of this invention provides a filter wherein the resistance to draw can be controlled to a selected value and made very uniform from cigarette to cigarette contrary to applicants' experience with filters of the prior commercial art. The isotropic fiber positioning within the filter also contributes to the formation of an effective filter of low resistance to draw, while the partial hydrophobic coating on the fibers protects the fiber bonds and lends a unique filtering action wherein both hydrophobic and hydrophilic surfaces are available for the impingement and absorption of objectionable materials. It will also be evident that the procedure for the manufacture of the present filter lends itself readily to the addition of desirable fibers, other than the fibrillatable cellulosic fibers used as a matrix, for example at least one member of the group consisting of glass, asbestos, polyolefin, polyamide and polyester fibers. The present filter structure also lends itself to the dispersed addition of desired additives for selective filtration such as the activated carbon particles disclosed by United States Patent No. 2,792,006, granted to Jan Ivo Mareck on May 14, 1957.

A more complete understanding of the present invention will be had by reference to the accompanying drawing, in which:

FIGURE 1 is an enlarged transverse view of one of the isotropic cellular filter units 1 made according to the method of this invention and attached to a cigarette 3, the tubular paper filter cover 2 being cut away to expose the filter and to illustrate its general construction.

Figure 2:
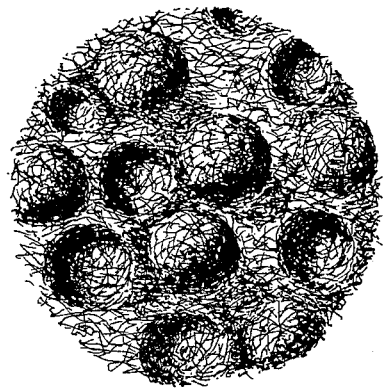

FIGURE 2 represents greatly enlarged view of the isotropic filter structure of FIGURE 1 at point B, illustrating the random, isotropic arrangement of the fibers disposed in the cellular divisions of the filter structure.

In carrying out the process of the invention, fibrillatable fibers including, for example, cotton linter fibers, sulfite and sulfate wood fibers, rayon staple fibers of the papermaking type, polystyrene grafted cellulose fibers, cellulose acetate fibers and the like are slurried in water and mechanically refined. The mechanical refining (fibrillation) of the fibers can be accomplished in any mechanical refining equipment with tackle adapted to enhance fibrillation as opposed to cutting of the fibers. For example, the refining of this invention can be accomplished in a Hollander beater, Valley beater, Mead refiner, Sprout Waldron refiner, or in refining machines of the conventional Jordan type. As stated above, a fibrillating action is desired and a Hollander beater or Valley beater with dulled cutting tackle edges is especially preferred to enhance the fibrillating action.

Applicants prefer to employ cotton linter fibers in the manufacture of the present filters and the fibrillation improvement in fiber bonding, allowing a product beneficial reduction in resin and latex addition, is noted at any increased amount of fibrillation refinement down to a level of Canadian Standard Freeness of about 30 ml. Below this level, excessive fiber cutting leading to loss of product tensile strength or cohesiveness is apparent. Applicants have found that beating to a Canadian Standard Freeness of about 400 ml. with the aforementioned beating equipment is preferred from the standpoint of bond strength with the minimum amounts of resin and latex.

The fibrillated fibers, still in slurry form at a consistency of about 1.5%, are treated in one embodiment of the invention with about 0.2% to about 2.0%, preferably 0.3% by weight, based on the fiber weight, of any of the formaldehyde adducts used in the preparation of wet strength papers, for example, melamine-formaldehyde. The melamine-formaldehyde treatment is followed by the addition of about 1.0% to about 20.0%, preferably 1.5%, based on the fiber weight, of elastomeric hydrophobic latex, preferably styrene-butadiene latex, to the fiber slurry. Although in the aforementioned preferred embodiment of the invention, the wet strength resin used to coagulate the latex is added to the slurry prior to the addition of the latex, the latex and coagulating agent may be added to the pulp slurry simultaneously. The latex and resin can also be added to the slurry in either order, or the two may be combined to form a separate slurry which is then added to the fiber slurry. The latter procedure, that of separate latex-coagulant slurry formation, may be preferred since it permits enhanced control of the particle size in the coagulation of the latex.

As stated hereinbefore, the latex can also be coagulated by other means such as the use of two or more latexes which are mutually incompatible, for example, the use of a vinyl chloride latex with an acrylonitrile latex. Latexes can also be coagulated by inorganic salts such as aluminum chloride (particularly as used in conjunction with carboxymethyl cellulose) and ceric sulphate, or organic polyamines, for example, triethylene tetramine.

Applicants have further noted that, if melamine-formaldehyde resin is used to coagulate styrene-butadiene latex, the addition of the resin will first coagulate the latex and further addition of resin will again peptize the latex. The latter condition of additional resin addition to repeptize the latex is preferred, so that the latex is coagulated by the addition of surfactant, for example, alkyl benzene sulfonate, in the following, or foaming, step.

In the preferred embodiment of the invention, the foaming step is carried out by adding about 0.01% to about 0.2%, preferably 0.05%, based on the slurry weight, of surfactant to the melamine-formaldehyde, styrene-butadiene treated fiber slurry, although greater or lesser amounts of surfactant can be employed as necessary to induce the desired foaming action.

It is noted, however, that the choice of surfactant used as a foaming agent is dependent upon the latex, or latex-resin system employed. For example, in the preferred melamine-formaldehyde, styrene-butadiene system a non-ionic foamer, for example, dodecyl dimethyl amine oxide (DDAO) is undesirable because of low foaming action. On the other hand, if urea-formaldehyde wet strength resin is substituted for melamine-formaldehyde resin in the preferred mode of operation, DDAO becomes the preferred foaming agent.

As noted above, the type of foaming agent used depends on the nature of the resin and latex. Generally, however, surfactants of the anionic type are preferred, and usually surfactants of the alkyl benzene sulfonate group are used where applicable, i.e., they have the desired stable foaming action.

In other embodiments of the invention, foaming agents, for example, sodium lauryl sulfate, which form less stable foam systems can be employed to advantage where it is desired to produce a denser, less permeable filter. Foaming agents producing less stable foam systems are also of use where it is intended that the final filter product be directly cast or extruded without resort to a compression step subsequent to drying.

After or during the addition of surfactant foamer to the slurry, air or other inert gas is added to the slurry by beating, agitation, whipping, bubbling or other means for inducing the formation of a foam system having a volume of about 1.5 to about 3.0 times the slurry volume.

In the preferred embodiment of the invention a turbine type propeller is used to foam the slurry system to about 2.5 times its slurry volume.

The foam system is then extruded or cast into desired filter shapes and dried to a density of about 0.5 pound per cubic foot to about 6.0 pounds per cubic foot, preferably about 1.0 pound per cubic foot. For use in tobacco smoke filters the isotropic, cellular fibrous system is dried or dried and compressed to a density of about 5.0 pounds per cubic foot to about 8.0 pounds per cubic foot, preferably 7.0 pounds per cubic foot. It is apparent that the surfactant foaming agent and the amount of gas introduced into the slurry both have a bearing on the density of the filter product. The final filter density is also controlled to a certain extent by the type of drying procedure employed. For example, air drying at ambient room temperature leads to a more dense filter (higher foam collapse) than does drying at elevated temperatures.

The process of this invention leading to the preferred product is carried out by refining about 100 parts by weight of cotton linters in an aqueous slurry at about 3% consistency, in the manner described hereinbefore, to a Canadian Standard Freeness of about 400 ml. so that maximum fibrillation is induced. In the preferred process the refining or fibrillation step is carried out in a Hollander type (Valley) beater with dulled cutting blades. The resulting pulp slurry of fibrillated fibers is first treated at about 1.5% pulp consistency with about 0.3% based on the fiber weight of melamine-formaldehyde adduct, a conventional wet-strength resin used in the manufacture of paper. Thereafter, about 1.5%, based on the fiber weight, of styrene-butadiene latex is added to the fiber slurry. The slurry is then foamed to about 2.5 times its slurry volume after the addition of about 0.05%, based on the slurry weight, of sodium dodecyl benzene sulfonate surfactant. The foamed mass, containing the fibrillated fibers, is then cast and drained on a screen with sufficient area to yield a product having a basis weight of about 0.06 lb./sq. ft. and a density of about 1.0 lb./cu. ft.

The dried product is cut into strips of desired length and having about a 0.75 inch square cross section. The square cross section strips are compressed to the 0.3 inch round shape of standard cigarette filters, wrapped and cut into the desired lengths for inclusion in cigarettes. It is also noted that the present filter units can be fed into cigarette manufacturing equipment and wrapped with cigarette paper in the final assembly of cigarettes.

The following example will further illustrate in detail a preferred manner in which the invention can be practiced. It will be understood, however, that the invention is not confined to the specific limitations set forth in the example, but rather to the scope of the appended claims.

Example

One hundred parts by weight of bleached cotton linter fibers were slurried in water at a fiber consistency of 1.5%. The fiber-containing slurry was then placed in a Valley beater with dull cutting blades and refined to a Canadian Standard Freeness of 400 ml. The beating process subjected the cotton linter fibers to a maximum amount of fibrillation together with a minimum amount of cutting. 0.3%, based on the fiber weight, of melamine-formaldehyde adduct (Parez 607—American Cyanamid Co.) prepared in the conventional fashion for use as a wet strength resin was added to the slurry with agitation and, subsequently, 1.5%, based on the fiber weight, of styrene-butadiene latex (Dylex K641—Koppers Co., Inc.) was added while continuing the agitation. Sodium dodecyl benzene sulfonate surfactant was then added to the slurry in an amount equal to 0.05% by weight of the slurry. Air was then beaten into the slurry with a high speed turbine agitator until the foam volume was 2.5 times the original slurry volume. The fiber-containing foam was then cast, drained and dried at 110° C. on a screen mold. The resulting isotropic cellular fiber pad had a basis weight of 0.06 pound per square foot and a density of 1.0 pound per cubic foot.

The isotropic cellular filter pad was cut into strips having a square cross section measuring 0.75 inch on a side. The square cross section of the strips was laterally compressed to form a round rod with a diameter of 8 mm., and the rod was wrapped with paper according to conventional practice in cigarette filter manufacture. The paper-wrapped rod was then cut into 20 mm. lengths for use as cigarette filters. The cigarette filters prepared according to the method of this example were then attached to cigarettes and mechanically "smoked" on an automatic puffing device as employed in the cigarette industry. The automatic puffing device used to obtain the data in this example was operated in accordance with the conventional United States puff parameters of a 35 milliliter puff of 2 seconds duration at intervals of 60 seconds. The filters of this example were compared with commercial filters of the same dimension composed of axially compressed bundles of cellulose acetate fibers running in the longitudinal direction of the cigarettes on the above described automatic puffing device. The following table sets forth comparative retention data obtained for various smoke fractions and the weight of the tested filters prior to smoking. The percentage figures tabulated are the percentage of the whole amount of the named materials generated by the cigarettes which were retained by the filter.

SMOKING DATA

| Property Measured | Filter of This Example | Cellulose Acetate Fiber Filter |
|---|---|---|
| Total particulate retention, percent | 57.0 | 51.3 |
| Non-volatile fraction retention, percent | 52.9 | 47.4 |
| Nicotine retention, percent | 51.3 | 43.9 |
| Filter weight (before smoking), mg | 110 | 159 |

It can readily be seen from the tabulated data above that the isotropic cellular filter of this example exhibits retention values considerably in excess of those obtained with the axially oriented cellulose acetate fiber filter. It is noted that the improvement in retention values was obtained for the isotropic cellular filter even though the cellulose acetate filter weighed considerably more, was thus more highly compressed and would be expected to have a greater filter action.

Isotropic cellular filters prepared by the process of the example with other compatible resin-latex-surfactant systems also exhibit the improved filtering action demonstrated above as do isotropic cellular filters formed from the foams of this example by other conventional methods, for example, extrusion, drying and post-compression. The beneficial filtering result will also be realized if the herein descrbed fiber-resin-latex-surfactant slurries are foamed to lesser level, extruded and dried to yield filters of comparable density with little or no compression after drying.

While the present invention has been described by setting forth preferred embodiments and examples, these are illustrative only, since other equivalent filter structures and processes will immediately occur to those skilled in the art. Therefore, the invention is not to be construed as limited, except as set fotrh in the following claims.

We claim:
1. A process for the manufacture of aerosol filters useful in the filtration of aerosol suspensions which comprises the steps of forming an aqueous fibrous slurry by slurrying fibers in water, said aqueous fibrous slurry containing a substantial proportion of fibrillated cellulosic fibers, adding about 1.0% to about 20.0%, based on the fiber weight in the fibrous slurry, of at least one elastomeric, hydrophobic latex to said aqueous fibrous slurry, adding about 0.01% to about 0.2%, based on the slurry weight, of a surfactant and foaming said aqueous fibrous slurry to a volume of about 1.5 to about 3.0 times the aqueous fibrous slurry volume by agitating in inert gas to form an isotropic, cellular fibrous structure, shaping by casting said isotropic, cellular fibrous structure, drying said isotropic, cellular fibrous structure to break the foam and leave the fibers in a bound isotropic cellular structure and thereafter compressing the dried isotropic, cellular fibrous structure to a density of about 5.0 to about 8.0 pounds per cubic foot.

2. A process for the manufacture of aerosol filters useful in the filtration of smoke from cigarettes, pipes, cigars and cigarillos which comprises the steps of mechanically refining an aqueous fibrous slurry, said aqueous fibrous slurry containing a substantial portion of fibrillatable cellulosic fibers, to a minimum Canadian Standard Freeness of about 30 milliliters, adjusting said aqueous fibrous slurry to about a 1.5% fiber consistency, adding about 0.2% to about 2.0%, based on the weight of fibers in the aqueous fibrous slurry, of a formaldehyde adduct wet strentgh resin to said aqueous fibrous slurry, adding about 1.0% to about 20.0%, based on the weight of fibers in the slurry, of an elastomeric, hydrophobicc latex to said aqueous fibrous slurry, adding about 0.01% to about 0.2%, based on the aqueous fibrous slurry weight, of a surfactant to the aqueous fibrous slurry, foaming the aqueous fibrous slurry to about 1.5 to about 3.0 times the aqueous fibrous slurry volume by beating in air to form an isotropic, cellular fibrous structure, casting said isotropic, cellular fibrous structure, drying said isotropic, cellular fibrous structure in its foamed condition to break the foam and leave the fibers in a bound isotropic cellular structure wtih a density of about 0.5 pound per cubic foot to about 6.0 pounds per cubic foot and thereafter compressing the dried isotropic, cellular fibrous structure into tobacco smoke filter units having a density of about 5.0 to about 8.0 pounds per cubic foot.

3. The process of claim 2 wherein the isotropic, cellular fibrous structure is extruded into rods for tobacco smoke filter units prior to drying the isotropic, cellular fibrous structure in its foamed condition and compressing the dried isotropic, cellular fibrous structure.

4. A process for the manufacture of filters useful in the filtration of smoke from cigarettes, pipes, cigars and cigarillos which comprises the steps of mechanically refining in a Hollander type beater with dulled cutting blades an aqueous fibrous slurry of cottom linter fibers to a Canadian Standard Freeness of about 400 milliliters, adjusting said aqueous fibrous slurry to about a 1.5% fiber consistency, adding about 0.3%, based on the weight of fibers in the aqueous fibrous slurry, of melamine-formaldehyde wet strength resin to said aqueous fibrous slurry, adding about 1.5%, based on the weight of fibers in the aqueous fibrous slurry, of styrene-butadiene latex to said aqueous fibrous slurry, adding about 0.05%, based on the slurry weight, of sodium dodecyl benzene sulfonate surfactant to the aqueous fibrous slurry, foaming the aqueous fibrous slurry to about 2.5 times the original aqueous fibrous slurry volume by beating in air with a turbine propeller to form an isotropic, cellular fibrous structure, casting said isotropic, cellular fibrous structure, drying said isotropic, cellular fibrous structure in its foamed condition to break the foam and leave the fibers in a bound isotropic, cellular structure with a density of about 1.0 pound per cubic foot and thereafter forming and compressing the dried isotropic, cellular fibrous structure into tobacco smoke filter units having a density of about 7.0 pounds per cubic foot.

5. The process of claim 4 wherein the wet strength resin is urea-formaldehyde wet strength resin, the latex is styrene-butadiene latex and the surfactant is dodecyl dimethyl amine oxide.

6. The process of claim 4 wherein the wet strength resin is melamine-formaldehyde wet strentgh resin, the latex is acrylonitrile latex and the surfactant is sodium dodecyl benzene sulfonate.

References Cited

UNITED STATES PATENTS

| | | |
|---|---|---|
| 2,336,944 | 12/1943 | Madge et al. _____ 264—50 XR |
| 2,568,866 | 9/1951 | Osterhof et al. |
| 2,576,318 | 11/1951 | Toulmin _____ 264—50 |
| 2,810,426 | 10/1957 | Till et al. |
| 3,025,202 | 3/1962 | Morgan et al. _____ 264—47 |

FOREIGN PATENTS 908,185   10/1962   Great Britain.

OTHER REFERENCES

Madge, E. W.: Latex Foam Rubber, New York, Interscience, 1962, p. 97.

PHILIP E. ANDERSON, Primary Examiner

U.S. Cl. X.R.

260—2.5; 264—45; 131—10